US012130002B2

(12) United States Patent
Niwa

(10) Patent No.: US 12,130,002 B2
(45) Date of Patent: Oct. 29, 2024

(54) AUTOMOBILE DISPLAY DEVICE

(71) Applicant: TOYOTA JIDOSHA KABUSHIKI KAISHA, Toyota (JP)

(72) Inventor: Takashi Niwa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/433,490

(22) Filed: Feb. 6, 2024

(65) Prior Publication Data

US 2024/0288145 A1 Aug. 29, 2024

(30) Foreign Application Priority Data

Feb. 28, 2023 (JP) ................................ 2023-030377

(51) Int. Cl.
| | |
|---|---|
| B60Q 3/14 | (2017.01) |
| B60K 35/00 | (2006.01) |
| B60Q 3/10 | (2017.01) |
| B60Q 3/62 | (2017.01) |
| F21V 3/04 | (2018.01) |
| G09F 13/04 | (2006.01) |
| G09F 13/08 | (2006.01) |
| G09F 13/10 | (2006.01) |

(52) U.S. Cl.
CPC ................ *F21V 3/04* (2013.01); *B60K 35/00* (2013.01); *B60Q 3/10* (2017.02); *B60Q 3/14* (2017.02); *B60Q 3/62* (2017.02); *G09F 13/0409* (2013.01); *G09F 13/08* (2013.01); *G09F 13/10* (2013.01)

(58) Field of Classification Search
CPC ... B60Q 3/10; B60Q 3/14; B60Q 3/62; B60K 35/00; G09F 13/0409; G09F 13/08; G09F 13/10
See application file for complete search history.

(56) References Cited

U.S. PATENT DOCUMENTS

| | | |
|---|---|---|
| 2009/0236209 A1 | 9/2009 | Ishii |
| 2015/0294540 A1 | 10/2015 | Hori |

FOREIGN PATENT DOCUMENTS

| | | | |
|---|---|---|---|
| JP | H07-030424 U | 6/1995 | |
| JP | H08-241645 A | 9/1996 | |
| JP | 2007-115633 A | 5/2007 | |
| JP | 2015-204212 A | 11/2015 | |
| WO | WO-2022113457 A1 * | 6/2022 | ............ G06F 3/044 |

* cited by examiner

*Primary Examiner* — Sean P Gramling
(74) *Attorney, Agent, or Firm* — SOLARIS Intellectual Property Group, PLLC

(57) ABSTRACT

There is provided an automobile display device including: a transmitting member that is made of a light-transmitting resin, that includes, at a rear face side thereof, an irradiated portion to which light from a light source is irradiated, and that includes, at a front face side thereof, a display portion emitting light by transmitting the light that has been irradiated to the irradiated portion, plural through holes being formed at portions of the transmitting member excluding the display portion during primary molding of two-color molding; and a non-transmitting member that is made of a non-light-transmitting resin, that is filled into the through holes and provided at the front face side and the rear face side of the transmitting member during secondary molding of the two-color molding, and that exposes the irradiated portion and the display portion.

7 Claims, 4 Drawing Sheets

AUTOMOBILE DISPLAY DEVICE

CROSS-REFERENCE TO RELATED APPLICATION

This application is based on and claims priority under 35 USC § 119 from Japanese Patent Application No. 2023-030377, filed on Feb. 28, 2023, the disclosure of which is incorporated by reference herein.

TECHNICAL FIELD

The present disclosure relates to an automobile display device.

RELATED ART

An illumination structure in which characters, symbols, and the like are illuminated by producing switches by two-color molding and transmitting light from a light source disposed at a rear face side are conventionally known (for example, refer to Japanese Patent Application Laid-Open (JP-A) No. H08-241645 (Patent Document 1)).

In an illumination structure such as described above, in order to suppress luminance reduction (a decrease in a proportion of transmitted light) in a display portion that displays characters, symbols, or the like of a transmitting member made of a light-transmitting resin, it is necessary to form a thickness of a non-transmitting member made of a non-light-transmitting resin that exposes the display portion, as thin as possible. This is because the thicker the thickness of the non-transmitting member that exposes the display portion is, the more the proportion of transmitted light that is reflected and absorbed by a wall face along a thickness direction of the non-transmitting member increases. However, if the thickness of the non-transmitting member is formed to be thin, the non-transmitting member may peel off from the transmitting member.

SUMMARY

Thus, an object of the present disclosure is to obtain an automobile display device capable of suppressing peeling off of a non-transmitting member from a transmitting member, even if a thickness of the non-transmitting member made of a non-light-transmitting resin that exposes a display portion of the transmitting member made of a light-transmitting resin is formed to be thin.

In order to achieve the aforementioned object, an automobile display device according to a first aspect of the present invention includes: a transmitting member that is made of a light-transmitting resin, that includes, at a rear face side thereof, an irradiated portion to which light from a light source is irradiated, and that includes, at a front face side thereof, a display portion emitting light by transmitting the light that has been irradiated to the irradiated portion, plural through holes being formed at portions of the transmitting member excluding the display portion during primary molding of two-color molding; and a non-transmitting member that is made of a non-light-transmitting resin, that is filled into the through holes and provided at the front face side and the rear face side of the transmitting member during secondary molding of the two-color molding, and that exposes the irradiated portion and the display portion.

According to the invention according to the first aspect, plural through holes are formed at portions excluding the display portion in the transmitting member that is made of the light-transmitting resin, that includes, at the rear face side thereof, the irradiated portion to which light from the light source is irradiated, and that includes, at the front face side thereof, the display portion emitting light by transmitting light that has been irradiated to the irradiated portion. Further, the non-transmitting member that is made of the non-light-transmitting resin, and that exposes the irradiated portion and the display portion, is filled into the respective through holes of the transmitting member and is provided at the front face side and the rear face side of the transmitting member. Namely, the non-transmitting member has a so-called anchor structure with respect to the transmitting member. Accordingly, even if a thickness of the non-transmitting member that exposes the display portion of the transmitting member is formed to be thin, peeling off of the non-transmitting member from the transmitting member is suppressed.

Further, an automobile display device according to a second aspect of the present invention is the automobile display device according to the first aspect, wherein a thickness of the non-transmitting member provided at the front face side of the transmitting member is equal to or less than three times a width of a leading end portion of the display portion.

According to the invention according to the second aspect, the thickness of the non-transmitting member provided at the front face side of the transmitting member is equal to or less than three times the width of the leading end portion of the display portion of the transmitting member. Accordingly, occurrence of deformation (collapse) at the display portion of the transmitting member during the secondary molding of the two-color molding (during flowing of the non-light-transmitting resin) is suppressed, compared to a case in which the thickness of the non-transmitting member provided at the front face side of the transmitting member is greater than three times the width of the leading end portion of the display portion of the transmitting member.

Further, an automobile display device according to a third aspect of the present invention is the automobile display device according to the first aspect or the second aspect, wherein a width of a base portion of the display portion is equal to or greater than 1.5 times a width of a leading end portion of the display portion.

According to the invention according to the third aspect, the width of the base portion of the display portion of the transmitting member is equal to or greater than 1.5 times the width of the leading end portion of the display portion of the transmitting member. Accordingly, luminance reduction in the display portion of the transmitting member (in a range from the base portion to the leading end portion) is even further suppressed, compared to a case in which the width of the base portion of the display portion of the transmitting member is smaller than 1.5 times the width of the leading end portion of the display portion of the transmitting member.

As described above, in the automobile display device according to the present disclosure, peeling off of a non-transmitting member from a transmitting member can be suppressed, even if a thickness of the non-transmitting member made of a non-light-transmitting resin that exposes a display portion of the transmitting member made of a light-transmitting resin is formed to be thin.

DETAILED DESCRIPTION

Figure 1:
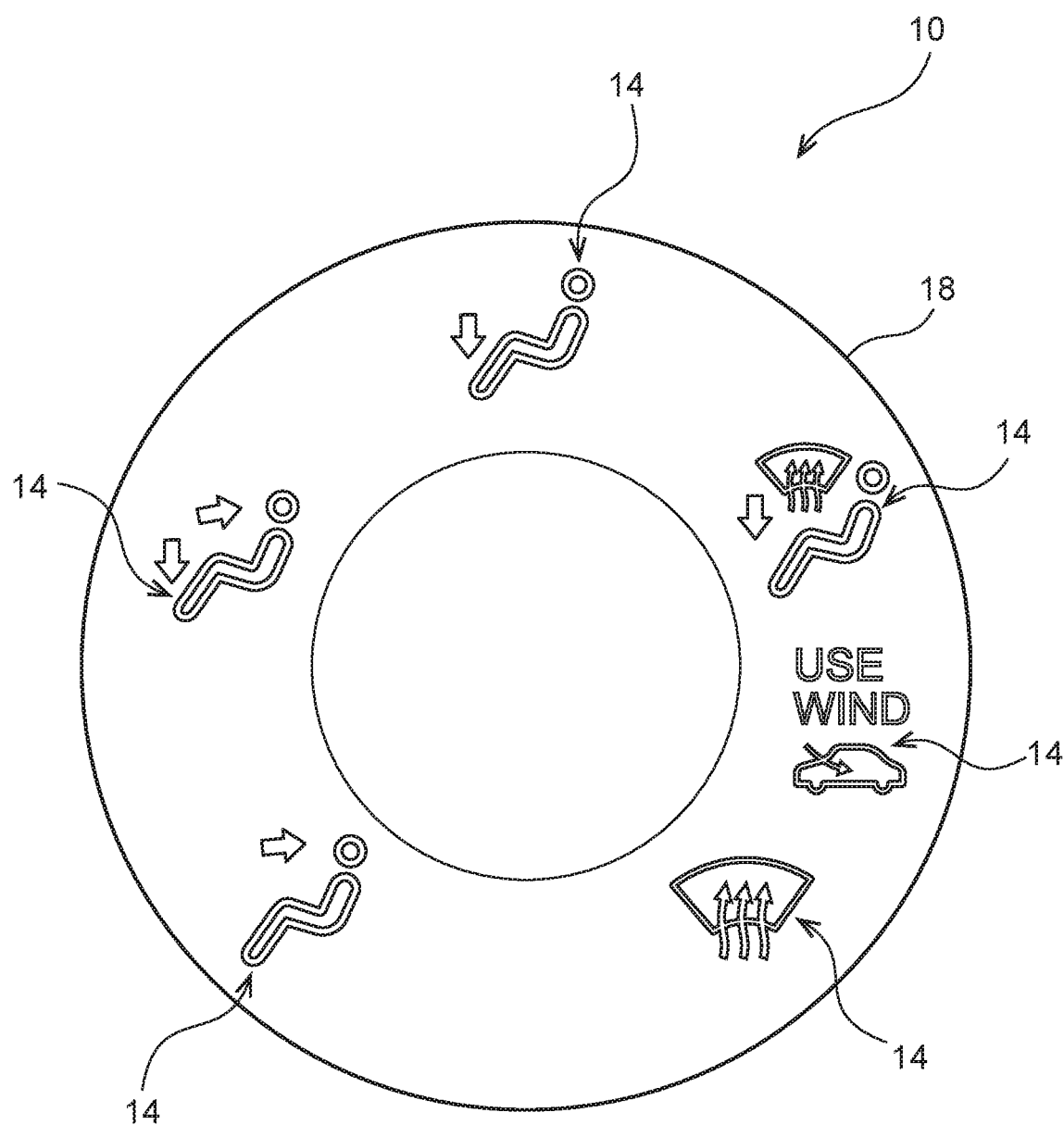
FIG. 1 is a schematic front view illustrating an automobile display device according to the present exemplary embodiment.

An exemplary embodiment of the present disclosure will be explained in detail below, based on the drawings. It should be noted that for convenience of explanation, as an automobile display device 10 according to the present exemplary embodiment, a display device that is provided at an instrument panel (not illustrated in the drawings) or the like at a vehicle cabin of an automobile and that displays a wind ejection direction and the like of an air conditioning device is used as an example (refer to FIG. 1).

As illustrated in FIG. 1, the automobile display device 10 according to the present exemplary embodiment is formed in a disc shape having a predetermined outer diameter, and a display portion 14 configured with predetermined characters, symbols, and the like is displayed at predetermined intervals in a circumferential direction at a design face thereof. Examples of the display portion 14 include a human shape indicated by a head portion formed in a circular shape and a body portion formed substantially in a crank shape with a predetermined width W1 (for example, about 0.3 mm) (refer to FIG. 2), an arrow indicating a direction of wind ejected from an ejection port (not illustrated in the drawings), a window frame and an arrow indicating a defroster, alphabetic characters indicating external air introduction, an automobile shape and an arrow, and the like.

Figure 2:
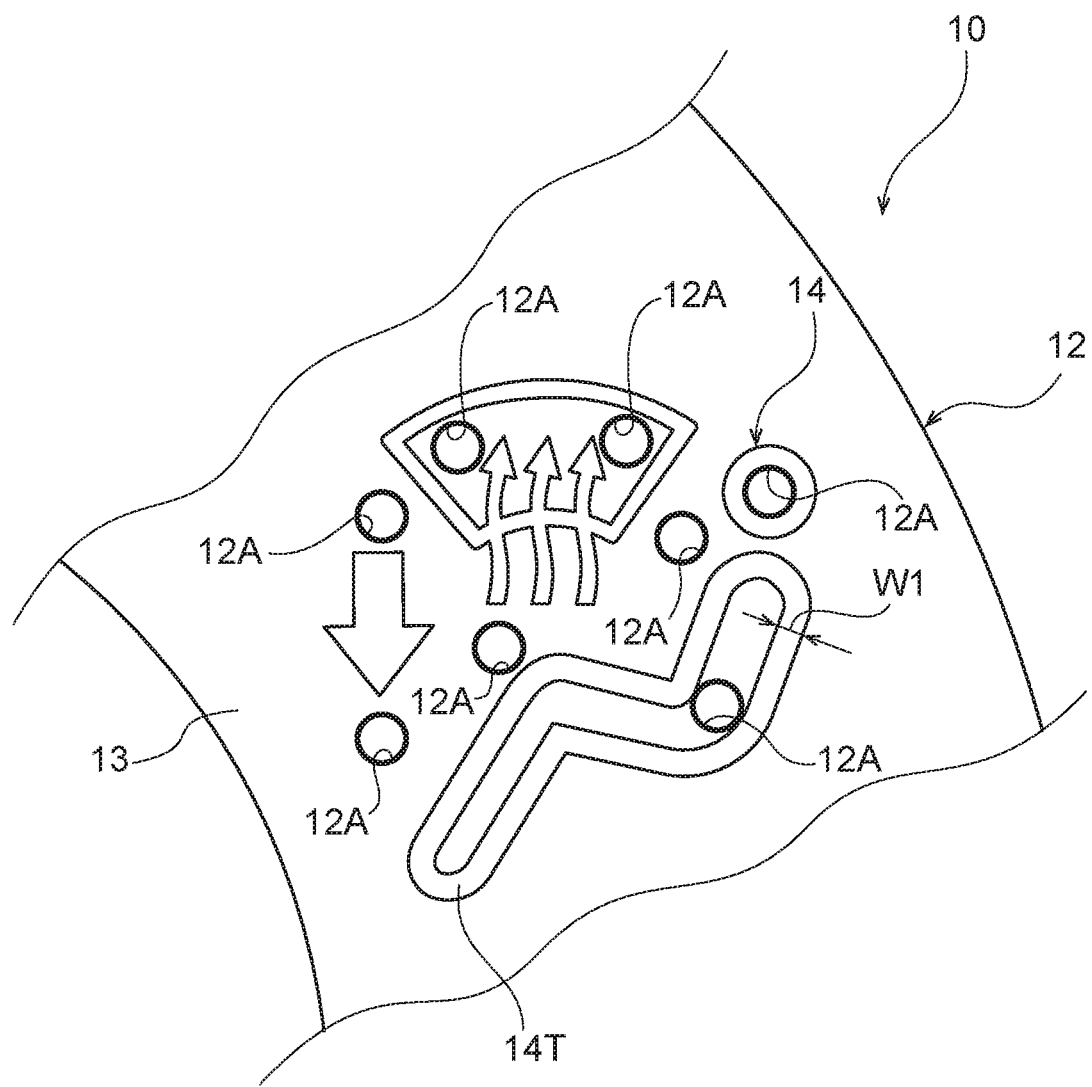
FIG. 2 is a schematic front view illustrating an enlarged view of a portion of a transmitting member of the automobile display device according to the present exemplary embodiment.
Figure 3:
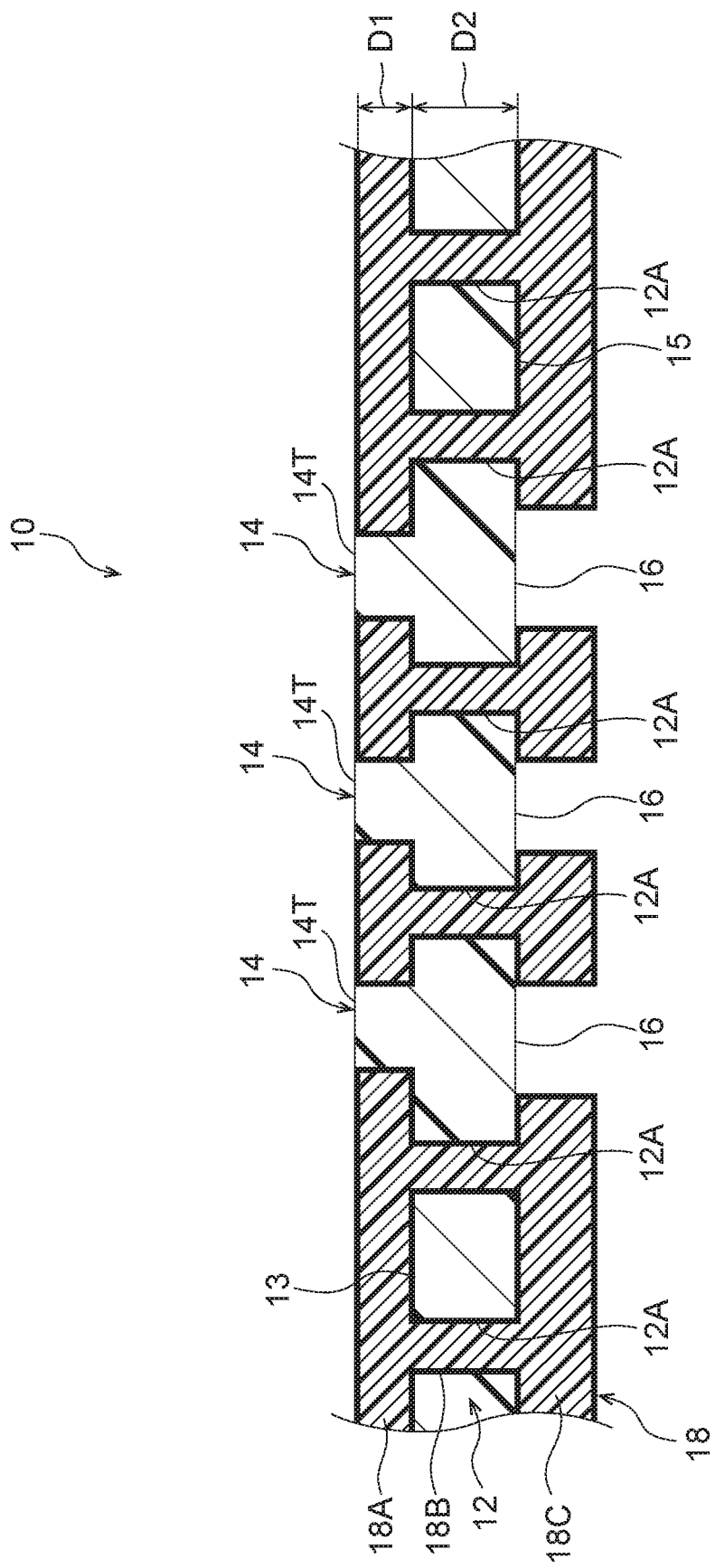
FIG. 3 is a schematic cross-sectional view illustrating an enlarged view of a portion of the automobile display device according to the present exemplary embodiment.

As illustrated in FIG. 2 and FIG. 3, such an automobile display device 10 is produced by two-color molding of a transmitting member 12 made of a light-transmitting resin, and a non-transmitting member 18 made of a non-light-transmitting resin. The transmitting member 12 serving as a primary molding member that is molded during primary molding of the two-color molding is, for example, white in color, and plural through holes 12A, serving as a bypass flow path configuring circular shapes in a front view, are formed at predetermined portions excluding the display portion 14. The non-transmitting member 18 serving as a secondary molding member that is molded during secondary molding of the two-color molding is, for example, black in color, is filled into the respective through holes 12A of the transmitting member 12, and is provided at a front face 13 side and a rear face 15 side of the transmitting member 12.

Namely, in the non-transmitting member 18, an outer layer 18A provided at the front face 13 side of the transmitting member 12 and an inner layer 18C provided at the rear face 15 side are connected by a connecting portion 18B that is filled into the through holes 12A. Thus, the non-transmitting member 18 is configured such that it is filled into the respective through holes 12A of the transmitting member 12 and is also present at the rear face 15 side thereof, and is formed so as to have a so-called anchor structure with respect to the transmitting member 12.

It should be noted that the non-transmitting member 18 is provided at the front face 13 side and the rear face 15 side of the transmitting member 12 so as to expose an irradiated portion 16 at the rear face 15 side of the transmitting member 12 that is irradiated with light from a light source (not shown in the drawings) and the display portion 14 (more specifically, a leading end portion 14T that will be described later) at the front face 13 side of the transmitting member 12 that emits light due to the light irradiated to the irradiated portion 16 being transmitted.

Figure 4:
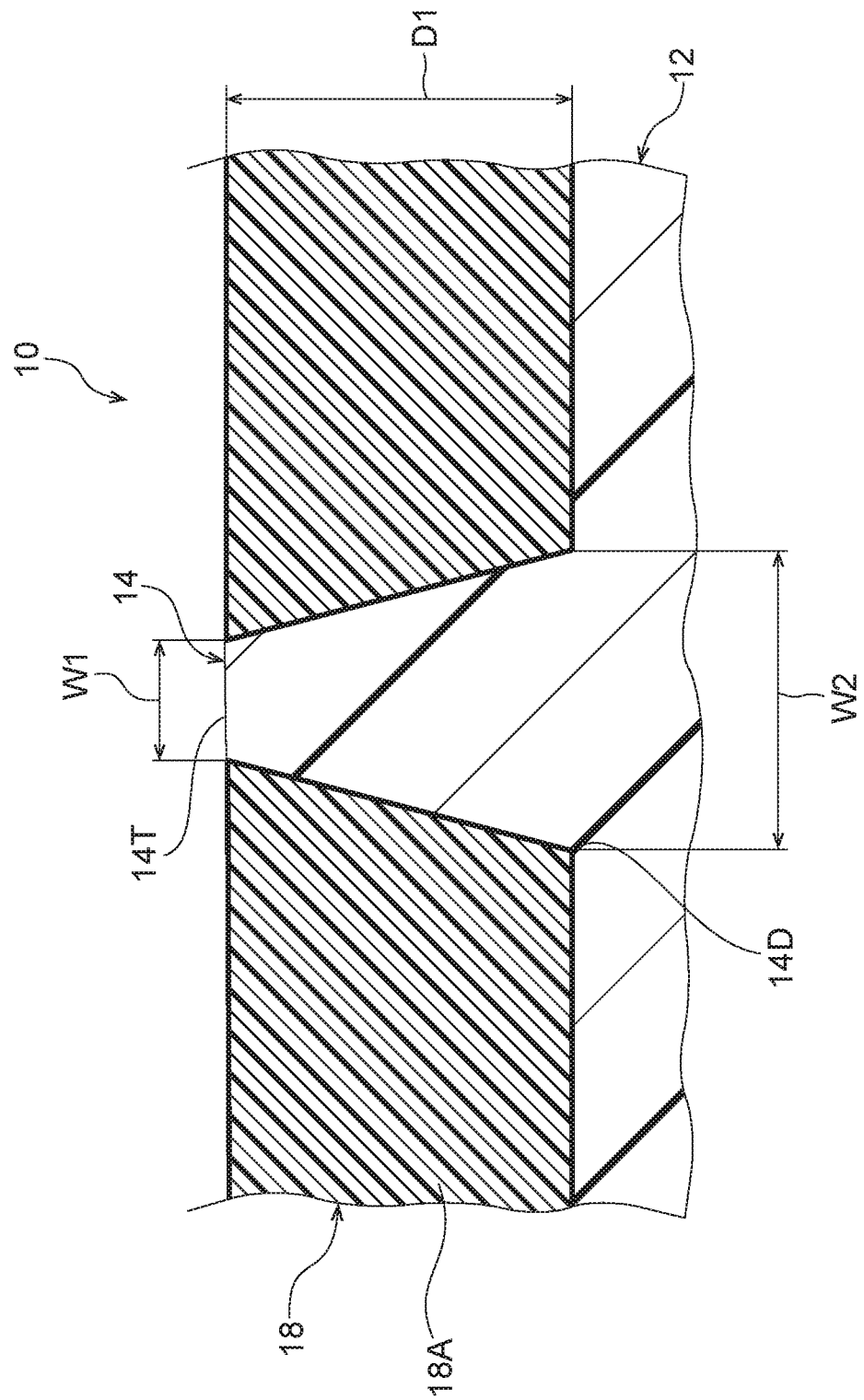
FIG. 4 is a schematic cross-sectional view illustrating an enlarged view of a portion of a display portion of the automobile display device according to the present exemplary embodiment.

Further, a thickness D1 of the non-transmitting member 18 provided around the display portion 14 (exposing the leading end portion 14T of the display portion 14) at the front face 13 side of the transmitting member 12 is formed to be thinner than a thickness D2 of the transmitting member 12. Specifically, as illustrated in FIG. 4, the thickness D1 of the non-transmitting member 18 is equal to or less than three times the width W1 ($D1 \leq 3 \times W1$) (also refer to FIG. 2) of the leading end portion 14T of the display portion 14 that is exposed from the non-transmitting member 18 (the outer layer 18A), and is less than 1 mm (preferably, about 0.7 mm to 0.8 mm).

Further, a width W2 of a base portion 14D of the display portion 14 at the front face 13 side of the transmitting member 12 is equal to or greater than 1.5 times the width W1 ($W2 \geq 1.5 \times W1$) of the leading end portion 14T of the display portion 14. It should be noted that the "base portion 14D" referred to herein is a portion that has a maximum width in a portion continuously formed in a tapered shape (an inclined shape at a predetermined angle) in a thickness direction from the leading end portion 14T of the display portion 14 in the cross-sectional view illustrated in FIG. 4.

Further, the light-transmitting resin according to the present exemplary embodiment is an amorphous thermoplastic resin, and examples thereof include acrylonitrile butadiene styrene (ABS), polycarbonate (PC), and the like. Furthermore, the non-light-transmitting resin according to the present exemplary embodiment is a crystalline thermoplastic resin having high fluidity, and examples thereof include polybutylene terephthalate (PBT), polypropylene (PP), and the like.

Next, operation of the automobile display device 10 according to the present exemplary embodiment configured as described above will be explained.

The automobile display device 10 is provided at an instrument panel (not illustrated in the drawings) or the like at a vehicle cabin of an automobile, and is configured such that, due to light from the light source being irradiated to the irradiated portion 16 at the rear face 15 side of the transmitting member 12 from the rear face 15 side thereof, one of the display portion 14 configured with the predetermined characters, symbols, or the like is caused to emit light to notify an occupant (not illustrated in the drawings) of a current wind ejection direction or the like of the air conditioning device.

In this regard, in conventional automobile display devices, miniaturization of characters, symbols, and the like has been dealt with by display processing using a painting laser, in which black paint is applied to a white molded member and laser cutting processing is performed. However, in the case of display processing using a painting laser, manufacturing costs are increased due to involving plural processes, and since painting processes are involved, this is not preferable from an environmental standpoint (carbon neutrality).

On the other hand, there are cases in which an automobile display device is produced by two-color molding using a white primary molding member and a black secondary molding member. However, in such cases, when a thickness of the secondary molding member that is provided around a display portion of the primary molding member (to expose the display portion) is set to be thicker, a large amount of a resin material of the secondary molding member is required, and there is a risk that, during secondary molding in which the secondary molding member is molded, deformation (collapse) of the display portion of characters, symbols, or the like in the primary molding member may occur due to fluid pressure of the resin material of the secondary molding member with respect to the primary molding member.

Further, the thicker a thickness of the secondary molding member provided around the display portion of the primary molding member (exposing the display portion) is, the more a proportion of transmitted light that is reflected and absorbed by a wall face along a thickness direction of the secondary molding member provided around the display portion is increased. In other words, the proportion of transmitted light emitted by the display portion decreases, and a luminance of the display portion is reduced.

Accordingly, in order to suppress deformation (collapse) of the display portion and luminance reduction (decrease in the proportion of transmitted light) in the display portion, it is necessary to form the thickness of the secondary molding member provided around the display portion of the primary molding member (exposing the display portion) to be as thin as possible. However, if the thickness of the secondary molding member is formed to be thin, there is a risk that the secondary molding member may peel off from the primary molding member.

Thus, in the automobile display device 10 according to the present exemplary embodiment, in the two-color molding using the transmitting member 12 serving as a primary molding member and the non-transmitting member 18 serving as a secondary molding member, a cross-sectional structure that is sandwiched at the front and rear (a so-called anchor structure) is employed, and as described above, resin materials to be used in the molding are appropriately set, and thicknesses and the like of the molding members are appropriately set. This will be explained below.

When the automobile display device 10 according to the present exemplary embodiment is produced by two-color molding, the plural through holes 12A are formed at predetermined portions, excluding the display portion 14, of the transmitting member 12 in which the display portion 14 such as characters, symbols or the like is formed. The non-transmitting member 18 is then filled into the respective through holes 12A of the transmitting member 12, and is provided in a state in which the display portion 14 and the irradiated portion 16 are exposed at the front face 13 side and the rear face 15 side of the transmitting member 12.

Namely, the non-transmitting member 18 is filled into the respective through holes 12A, is also present at the rear face 15 side of the transmitting member 12, and forms a so-called anchor structure with respect to the transmitting member 12. Accordingly, even if the thickness D1 of the non-transmitting member 18 (the outer layer 18A) provided around the display portion 14 (exposing the leading end portion 14T of the display portion 14) is formed to be thin, peeling off of the non-transmitting member 18 provided around the display portion 14 from the transmitting member 12 can be suppressed.

Consequently, the thickness D1 of the non-transmitting member 18 (the outer layer 18A) can be formed to be as thin as possible. Specifically, the thickness D1 of the non-transmitting member 18 (the outer layer 18A) can be made to be equal to or less than three times the width W1 at the leading end portion 14T of the display portion 14, and can be made to be less than 1 mm (preferably, about 0.7 mm to 0.8 mm).

Accordingly, compared to a case in which the thickness D1 of the non-transmitting member 18 (the outer layer 18A) is greater than three times the width W1 at the leading end portion 14T of the display portion 14 (equal to or greater than 1 mm), occurrence of deformation (collapse) at the display portion 14 of the transmitting member 12 due to the fluid pressure of the non-transmitting member 18 with respect to the transmitting member 12 during secondary molding (during flowing of the non-light-transmitting resin) in which the non-transmitting member 18 is molded can be suppressed or prevented. Thus, even minute characters, symbols, or the like, which could only be processed with a painting laser, can be displayed.

Further, since the thickness D1 of the non-transmitting member 18 (the outer layer 18A) provided around the display portion 14 (exposing the leading end portion 14T of the display portion 14) can be formed to be thin as described above, decreasing of the proportion of transmitted light that is transmitted from the irradiated portion 16 to the display portion 14 (reflection and absorption of the transmitted light at the wall face along the thickness direction of the non-transmitting member 18) can be suppressed, and reduction of the luminance of the display portion 14 can be suppressed.

In particular, the width W2 at the base portion 14D of the display portion 14, which is at the front face 13 side of the transmitting member 12, is made to be equal to or greater than 1.5 times the width W1 at the leading end portion 14T of the display portion 14. Accordingly, luminance reduction in the display portion 14 (in the range from the base portion 14D to the leading end portion 14T) can be even further suppressed, compared to a case in which the width W2 at the base portion 14D of the display portion 14 is made to be smaller than 1.5 times the width W1 at the leading end portion 14T of the display portion 14.

Although the automobile display device 10 according to the present exemplary embodiment has been explained above based on the drawings, the automobile display device 10 according to the present exemplary embodiment is not limited to that which is illustrated in the drawings, and appropriate design modification can be implemented within a range that does not depart from the spirit of the present disclosure. For example, the characters, symbols, and the like that are displayed as the display portion 14 are not limited to those illustrated in the drawings. Further, the automobile display device 10 is also not limited to the disc shape illustrated in the drawings.

What is claimed is:
1. An automobile display device comprising:
a transmitting member that is made of a light-transmitting resin, that includes, at a rear face side thereof, an irradiated portion to which light from a light source is irradiated, and that includes, at a front face side thereof, a display portion emitting light by transmitting the light that has been irradiated to the irradiated portion, a plurality of through holes being formed at portions of the transmitting member excluding the display portion during primary molding of two-color molding; and
a non-transmitting member that is made of a non-light-transmitting resin, that is partly filled into the through holes during secondary molding of the two-color molding, and that exposes the irradiated portion and the display portion, wherein the non-transmitting member comprises an outer layer provided at the front face side of the transmitting member, an inner layer provided at the rear face side of the transmitting member, and a connecting portion that is filled into the through holes to connect between the outer layer and the inner layer, the outer layer and the inner layer being wider than the connecting portion.

2. The automobile display device according to claim 1, wherein a thickness of the non-transmitting member provided at the front face side of the transmitting member is equal to or less than three times a width of a leading end portion of the display portion.

3. The automobile display device according to claim 1, wherein a width of a base portion of the display portion is equal to or greater than 1.5 times a width of a leading end portion of the display portion.

4. The automobile display device according to claim 2, wherein a width of a base portion of the display portion is equal to or greater than 1.5 times a width of a leading end portion of the display portion.

5. The automobile display device according to claim 1, wherein edges of the outer layer and the inner layer of the non-transmitting member in a width direction respectively extend beyond a width of the connecting portion, such that extended edges of the outer layer and the inner layer form an anchoring portion that holds the non-transmitting member to the transmitting member.

6. The automobile display device according to claim 1, wherein the outer layer of the non-transmitting member is disposed inside an indentation formed on the transmitting member such that a front face side of the outer layer of the non-transmitting member is co-planar with the display portion of the transmitting member.

7. The automobile display device according to claim 5, wherein the edge of the outer layer in a width direction forms a tapered shape wherein a front face side of the edge of the outer layer is wider than a rear face side of the edge of the outer layer.

* * * * *